(12) United States Patent
Jeon et al.

(10) Patent No.: US 6,754,425 B2
(45) Date of Patent: Jun. 22, 2004

(54) DISPERSION FLATTENED FIBER WITH HIGH NEGATIVE DISPERSION AND METHOD FOR THE MANUFACTURE THEREOF

(75) Inventors: Jeong U Jeon, Daejeon (KR); Young Tark Lee, Daejeon (KR)

(73) Assignee: Korea Telecom, Gyeonggi-do (KR)

( * ) Notice: Subject to any disclaimer, the term of this patent is extended or adjusted under 35 U.S.C. 154(b) by 0 days.

(21) Appl. No.: 10/669,868

(22) Filed: Sep. 23, 2003

(65) Prior Publication Data

US 2004/0055341 A1 Mar. 25, 2004

Related U.S. Application Data

(63) Continuation of application No. 09/776,762, filed on Feb. 6, 2001, now Pat. No. 6,650,813.

(30) Foreign Application Priority Data

Oct. 13, 2000 (KR) .......................................... 2000-60413

(51) Int. Cl.[7] .............................. G02B 6/22; C02B 37/10
(52) U.S. Cl. .......................................... 385/127; 65/428
(58) Field of Search ................................. 385/126–128; 65/385–435

(56) References Cited

U.S. PATENT DOCUMENTS

| 4,265,515 | A | * | 5/1981 | Kao | 385/127 |
| 4,327,965 | A | * | 5/1982 | Black | 385/123 |
| 4,372,648 | A | * | 2/1983 | Black | 385/127 |
| 5,942,296 | A | * | 8/1999 | Oh et al. | 428/34.6 |
| 6,280,850 | B1 | * | 8/2001 | Oh et al. | 428/428 |
| 6,317,552 | B1 | * | 11/2001 | Berkey | 385/127 |

* cited by examiner

*Primary Examiner*—Akm Enayet Ullah
*Assistant Examiner*—Jerry T Rahll
(74) *Attorney, Agent, or Firm*—Jones Day

(57) ABSTRACT

The invention relates to a dispersion flattened fiber (DFF) with high negative dispersion and a manufacturing method thereof. The dispersion flattened fiber comprises a central core; ring-type cores and low refractive regions alternately formed outside the central core; a cladding surrounding outside the ring-type cores and low refractive regions; and a coating outside the cladding. Since the dispersion flattened fiber has the dispersion of –20 to –60, it has a wide range of application and can be used for various purposes in the field of optical telecommunication.

12 Claims, 4 Drawing Sheets

FIG.5

| | DIAMETER [μm] | DIAMETER [μm] | INDEX DIFFERENCE |
|---|---|---|---|
| A CENTRAL CORE 10 | 2.8 | 3.36 | 0.021 |
| A SECOND LOW REFRACTIVE REGION 11 | 6.8 | 8.16 | −0.004 |
| A SECOND RING-TYPE CORE 12 | 8.56 | 10.27 | 0.005 |
| A FIRST LOW REFRACTIVE REGION 13 | 14.08 | 16.9 | −0.004 |
| A FIRST RING-TYPE CORE 14 | 15.84 | 19.0 | 0.005 |
| A CLADDING 15 | 125 | 125 | 0.0 |
| DISPERSION (1.55 μm) [ps/nm/km] | −56 | −27 | |
| DISPERSION SLOPE (1.55 μm) [ps/nm²/km] | −0.00011 | +0.00075 | |

DISPERSION FLATTENED FIBER WITH HIGH NEGATIVE DISPERSION AND METHOD FOR THE MANUFACTURE THEREOF

CROSS-REFERENCE TO RELATED APPLICATIONS

This application is a continuation of U.S. application Ser. No. 09/776,762, filed Feb. 6, 2001 now U.S. Pat. No. 6,650,813. The contents of this prior application is incorporated herein in its entirety by reference.

FIELD OF THE INVENTION

The present invention relates to a dispersion flattened fiber (DFF) with high negative dispersion and a method for the manufacture thereof; and, more particularly, to a dispersion flattened fiber with high negative dispersion to be utilized for a dispersion compensation in a conventional single mode fiber (SMF) or a non-zero dispersion shifted fiber (NZDSF) by setting up a dispersion thereof to be high negative, i.e., ranging, e.g., from −20 to −60, not zero, at a wavelength band of 1.55 μm.

DESCRIPTION OF THE PRIOR ART

In the field of optical communications, dispersion is defined as a pulse-spreading phenomenon caused due to the fact that the wave velocity of an optical signal passing through an optical fiber varies depending on the wavelength thereof.

As a conventional optical fiber for transmission, there exist an SMF optimized for a 1.31 wavelength band and an NZDSF with a small dispersion for 1.55 μm wavelength band, and the like.

However, when the conventional SMF or NZDSF is used, a maximum transmission distance is limited as a transmission speed increases. Generally, the relationship between the transmission speed B [Gb/s] and the maximum transmission distance L is shown as follows:

$$L = \frac{104000}{B^2 \times D} \quad \text{Eq. 1}$$

wherein D represents a dispersion.

When the SMF (whose dispersion is about 17 ps/nm/km at a wavelength of 1.55 μm) is used to transmit an optical signal at a speed of 2.5 Gb/s, a maximum transmission distance is 979 km according to Eq. 1, but when the transmission speed increases to 10 Gb/s, the maximum transmission distance is diminished to just about 60 km. When the NZDSF (a dispersion thereof is about 2 to 7 ps/nm/km) is used to transmit the optical signal with the transmission speed of 10 Gb/s, the maximum transmission distance is limited to about 148 km. In the case of adopting a wavelength division multiplexing (WDM) transmission method that features high speed and big capacity, a dispersion slope as well as the dispersion must be taken into consideration in order to estimate a maximum transmission distance.

Accordingly, in order to increase the maximum transmission distance at a predetermined wavelength band, it is essential to compensate not only the dispersion but also the dispersion slope. As a solution to this assignment, a dispersion compensation fiber (DCF) has been developed. Although the DCF compensates for both the dispersion and the dispersion slope simultaneously, the manufacturing process thereof is too complicated.

Up to now, researches in the DCF have been mainly focused on a method for flattening the dispersion to be nearly zero at a wavelength band of 1.55 μm.

When the SMF is employed to transmit an optical signal at a transmission speed of more than 10 Gbps, both the dispersion and dispersion slope, which limit directly the maximum transmission distance, must be compensated. This can be achieved by employing a DCF that compensates both the dispersion and the dispersion slope at the same time. However, a manufacture of the DCF has not been easy.

A variety of methods for compensating a dispersion of an optical fiber by using a dispersion compensation module, which comprises DCFs, have been developed. Since it is not easy to produce a DCF capable of simultaneously compensating both the dispersion and the dispersion slope, an alternative method using two separate DCFs for exact dispersion compensation has also been developed as follows:

$$L_{DCF1} \times D_{DCF1} + L_{DCF2} \times D_{DCF2} + L_{SMF} \times D_{SMF} = 0 \quad \text{Eq. 2}$$

$$\frac{S_{SMF}}{D_{SMF}} = \frac{L_{DCF1} \times S_{DCF1} + L_{DCF2} \times S_{DCF2}}{L_{DCF1} \times D_{DCF1} + L_{DCF2} \times D_{DCF2}} \quad \text{Eq. 3}$$

wherein $L_{DCF1}$, $L_{DCF2}$ and $L_{SMF}$ represent the maximum transmission distance of a first DCF, a second DCF and a SMF, respectively; $D_{DCF1}$, $D_{DCF2}$ and $D_{SMF}$ stand for the dispersion of the first DCF, the second DCF and the SMF, respectively; and $S_{DCF1}$, $S_{DCF2}$ and $S_{SMF}$ represent the dispersion slope of the first DCF, the second DCF and the SMF, respectively.

In the case of using two different DCFs, it is required to combine the dispersions and the dispersion slopes of the two DCFs, so that the exact compensation for the dispersion becomes more difficult.

SUMMARY OF THE INVENTION

It is, therefore, the object of the present invention to provide a dispersion flattened fiber having high negative dispersion as well as flat dispersion characteristic at a transmission wavelength band so as to compensate the dispersion with advanced facility and exactness, and also provide a manufacturing method of such dispersion flattened fiber.

In accordance with a preferred embodiment of the present invention, there is provided a dispersion flattened fiber with high negative dispersion comprising:

a central core;

ring-type cores and low refractive regions alternately formed outside the central core;

a cladding formed surrounding the ring-type cores and the low refractive regions; and a coating formed outside the cladding so as to protect the central core, the ring-typed cores, the low refractive regions and the cladding.

BRIEF DESCRIPTION OF THE DRAWINGS

The above and other objects and features of the present invention will become apparent from the following description of preferred embodiments given with reference to the accompanying drawings in which:

FIG. 5 depicts a table describing a design and characteristics of the optical fiber shown in FIG. 1.

DETAILED DESCRIPTION OF THE INVENTION

Figure 1:
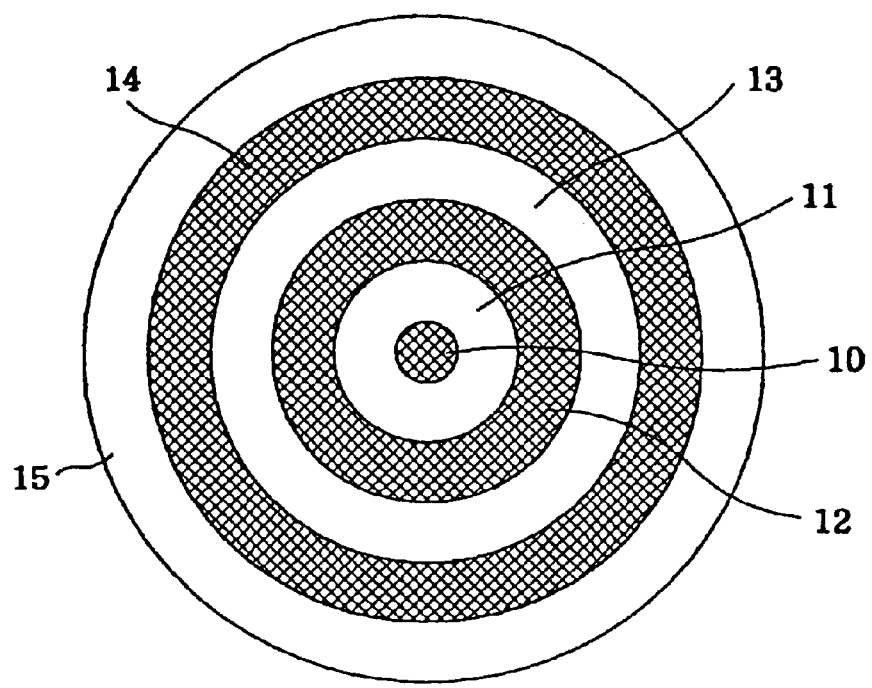
FIG. 1 represents a cross sectional view of a dispersion flattened fiber with high negative dispersion in accordance with a first embodiment of the present invention.

FIG. 1 is a cross sectional view for showing a structure of a dispersion flattened fiber with high negative dispersion in accordance with a first embodiment of the present invention. The dispersion flattened fiber comprises a cladding 15, a first and a second ring-type core 14 and 12, a first and a second low refractive region 13 and 11, and a central core 10.

At the outmost region of the dispersion flattened fiber, there is formed a polymer coating (not shown) to protect the dispersion flattened fiber. There is located the cladding 15 inside the polymer coating and the first ring-type core 14 in accordance with the present invention within the cladding 15. The first low refractive region 13 is formed at the inner region of the first ring-type core 14. Inside the first low refractive region 13 there is located the second ring-type core 12 and, the second low refractive region 11 is formed within the second ring-type core 12. Finally, at the central area within the second low refractive region 11, there is formed the central core 10.

The refractive indexes of the central core 10 and the second ring-type core 12 are higher than those of the other regions. The refractive index of the cladding 15 is equal to that of pure silica. The first and the second low refractive region 13 and 11 have lower refractive indexes than the cladding 15. The refractive index of the second ring-type core 12 is the same as that of the first ring-type core 14. The second low refractive region 11 has the same refractive index as the first low refractive region 13. Ge or P may be added to increase the refractive index of the central core 10 and the first and the second ring-type core 12 and 14.

Figure 2:
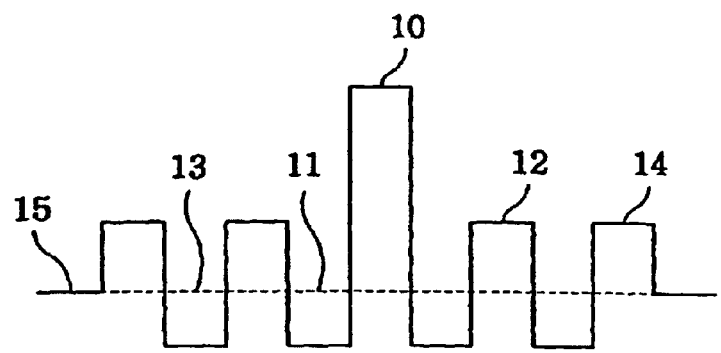
FIG. 2 is a schematic drawing showing a refractive index of the optical fiber of FIG. 1 along its radius.

FIG. 2 is a schematic drawing for showing a refractive index profile along the radius of the fiber, in which the central core 10 has the highest refractive index and the first and the second ring-type core 12 and 14 have lower refractive indexes than the central core 10. Although a step-type refractive index profile has been used in FIG. 2, a hill-type or curved refractive index profile can be included as well.

Figure 3:
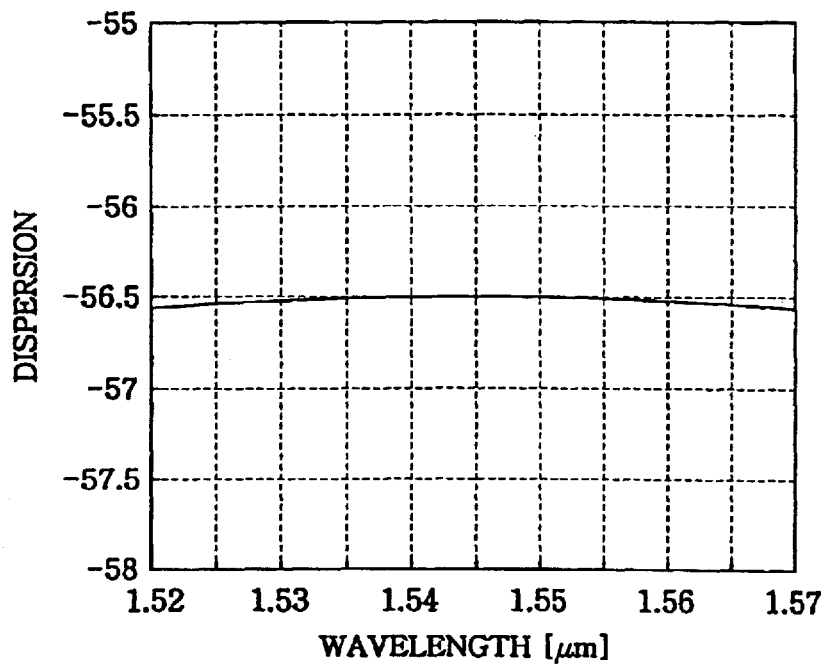
FIG. 3 is a graph showing a C-band characteristic of the optical fiber in FIG. 1.

FIG. 5 is a table for showing design data and characteristics of the optical fiber shown in FIG. 1, wherein variation of the refractive index along the radius of the optical fiber is shown. FIG. 3 shows the C band (1.55 $\mu$m wavelength band) dispersion characteristic of the optical fiber having the features described in FIG. 5.

Small changes in the diameters of the first low refractive region 13 and the first ring-type core 14 do not influence much on the dispersion and the dispersion flattened characteristics of the optical fiber. Unlike most of the conventional optical fibers, the dispersion flattened fiber of the present invention has a much better bend loss characteristic, e.g., about 0.0001102 dB/km. Further, the dispersion slope of the present invention is flatter than that of the conventional dispersion flattened fibers.

Figure 4:
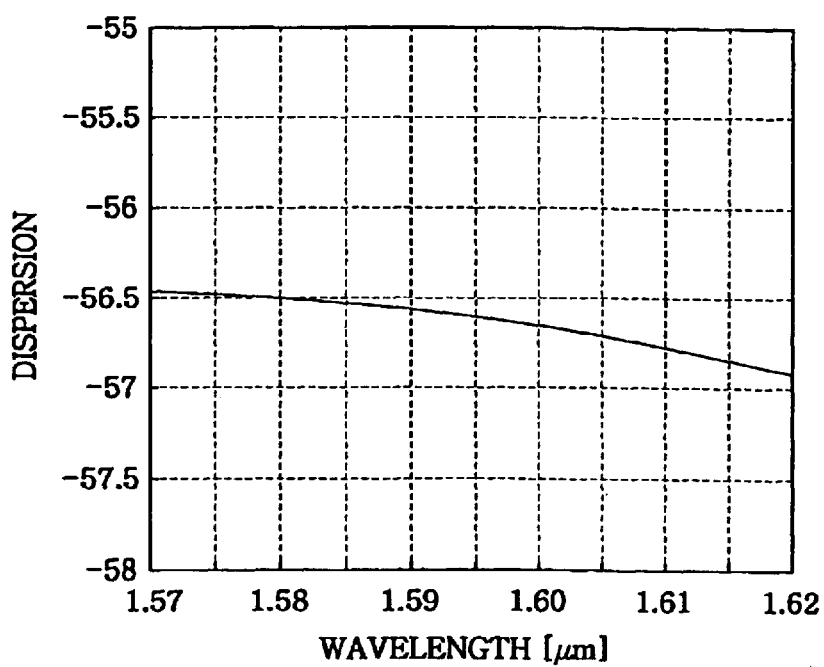
FIG. 4 presents a graph illustrating an L-band characteristic of the optical fiber as shown in FIG. 1.

FIG. 4 is a graph presenting an L-band (1570 to 1620 nm) dispersion characteristic of the optical fiber as shown in FIG. 1. The L-band is required for the high-density wavelength division multiplexing mode.

Figure 6:
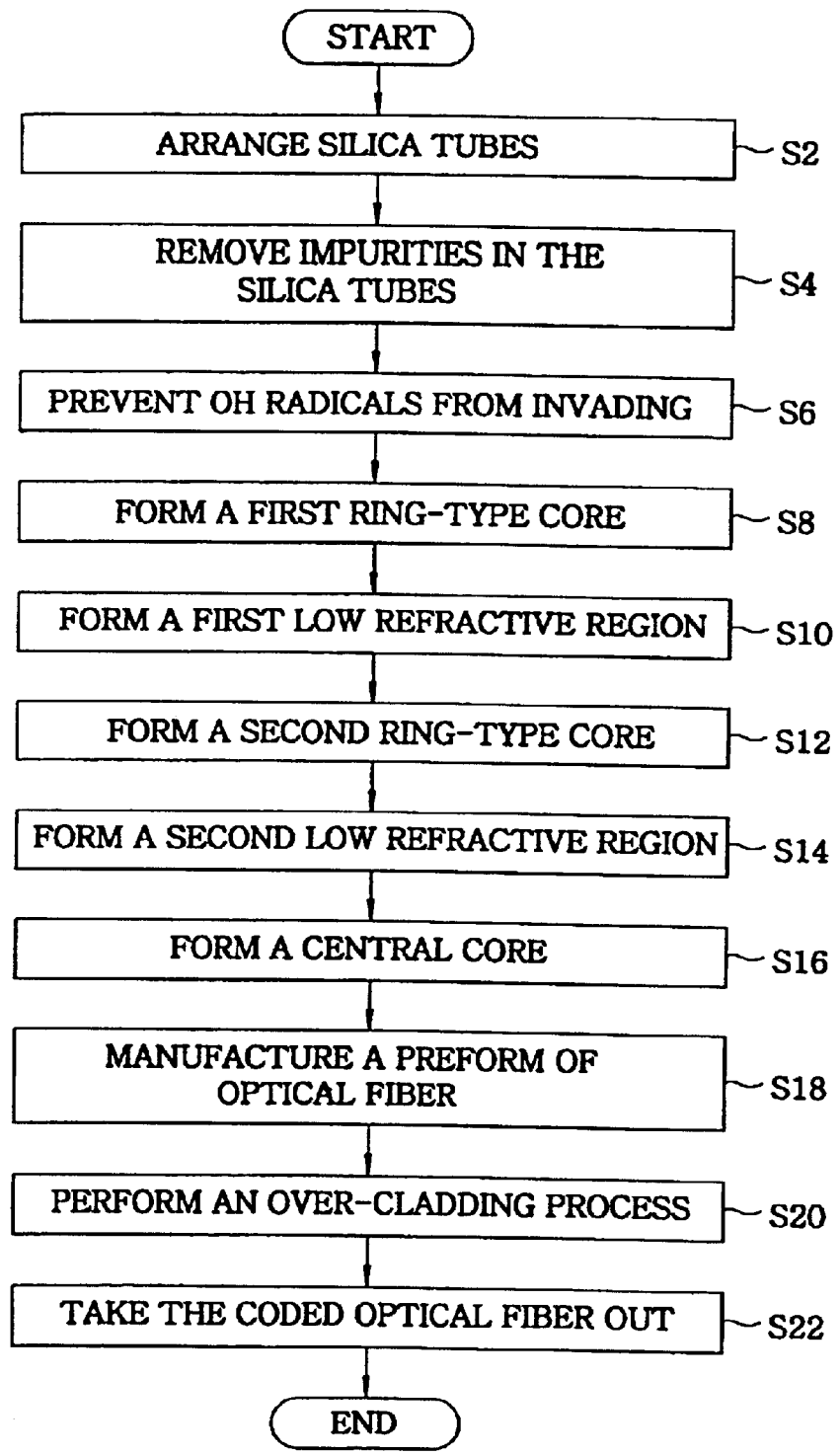
FIG. 6 sets forth a flow chart of a manufacturing method for the dispersion flattened fiber with high negative dispersion in accordance with the first embodiment of the present invention.

FIG. 6 is a flow chart illustrating a step-by-step process for manufacturing the dispersion flattened fiber with high negative dispersion through a modified chemical vapor deposition in accordance with the first embodiment of the present invention.

First, in step S2 silica tubes are arranged exactly on a MCVD board.

The silica tubes are heated in step S4 by an oxygen/hydrogen burner at a temperature of 1900° C. to get rid of any impurities inside and outside the silica tubes.

In step S6, the cladding 15 is formed to prevent an invasion of OH radicals by using $SiCl_4$ to make the refractive index of the cladding 15 identical with that of the silica tubes.

In step S8, $GeCl_4$ or $POCl_3$ is used together with $SiCl_4$ to form the first ring-type core 14 whose refractive index is higher than that of the silica tubes within the cladding 15.

In step S10, the first low refractive region 13 whose refractive index is lower than that of the silica tubes is formed inside the first ring-type core 14 by keeping fluorine source, e.g., $C_2F_6$ or $SiF_4$, flowing into the silica tubes together with $SiCl_4$.

The second ring-type core 12 having a higher refractive index than that of the silica tube is formed within the first low refractive region 13 by using $GeCl_4$ or $POCl_3$ gas together with $SiCl_4$ in step S12.

In step S14, the second low refractive region 11 having a lower refractive index than that of the silica tube is formed within the second ring-type core 12 by having fluorine gas $C_2F_6$ or $SiF_4$ together with $SiCl_4$ flow into the silica tube.

The central core 10 with the highest refractive index is formed within the second low refractive region 11 by providing both $SiCl_4$ and $GeCl_4$ into the silica tube and heating them by the burner in step S16.

A preform of the optical fiber having the refractive index profile given in accordance with the present invention is manufactured in step S18 by heating the silica tube using an oxygen/hydrogen burner under high temperature of 2000° C. or beyond to completely infill remaining holes within the silica tube.

Over-cladding or jacketing process can be carried out in step S20 if required, where a silica tube is jacketed on the preform of the optical fiber.

From the preform of the optical fiber manufactured as recited above, optical fiber of 125 $\mu$m in diameter may be extracted with an optical fiber take-out apparatus. During this process, the optical fiber goes through a first and a second coating, and finally gets the optical fiber of 250 $\mu$m in diameter in step S22.

In view of the foregoing, the dispersion flattened fiber of the present invention has a negative dispersion ranging from −20 to −60 at the wavelength band of about 1.55 $\mu$m and also has a dispersion slope much flatter than those of conventional dispersion flattened fibers. In addition, the dispersion flattened fiber can be easily manufactured because of its high flexibility on the diameter.

While the present invention has been described with respect to the particular preferred embodiments, it will be apparent to those skilled in the art that various changes and modifications may be made without departing from the spirit and scope of the invention as defined in the following claims.

What is claimed is:

1. A manufacturing method of a dispersion flattened fiber with high negative dispersion ranging from about −20 ps/nm/km to about −60 ps/nm/km, comprising the steps of:
   (a) preparing a silica tube;
   (b) cleaning the silica tube;
   (c) forming a cladding on an inner peripheral surface of the silica tube;
   (d) forming a first ring-type core on an inner peripheral surface of the cladding;
   (e) forming a first low refractive region on an inner peripheral surface of the first ring-type core, wherein the refractive index of the first low refractive region is lower than that of the cladding;
   (f) forming a second ring-type core on an inner peripheral surface of the first low refractive region;
   (g) forming a second low refractive region on an inner peripheral surface of the second ring-type core, wherein the refractive index of the second low refractive region is lower than that of the cladding;
   (h) forming a central core on an inner peripheral surface of the second low refractive region;
   (i) heating the silica tube, thereby forming a preform of the dispersion flattened fiber; and
   (j) extracting the dispersion flattened fiber from the perform.

2. The method of claim 1, wherein the silica tube is prepared on a board for a modified chemical vapor deposition at step (a).

3. The method of claim 1, wherein the silica tube is heated under the temperature of about 1900° C. at step (b).

4. The method of claim 1, wherein the cladding has the same refractive index as the silica tube.

5. The method of claim 1, wherein the cladding is formed using $SiCl_4$.

6. The method of claim 1, wherein the first ring-type core having a refractive index higher than that of the cladding is formed by using $GeCl_4$ or $POCl_3$ together with $SiCl_4$.

7. The method of claim 1, wherein $C_2F_6$ or $SiF_4$ flows together with $SiCl_4$ into the silica tube in order to form the first low refractive region.

8. The method of claim 1, wherein the second ring-type core having a refractive index higher than that of the cladding is formed by having $GeCl_4$ or $POCl_3$ with $SiCl_4$ gas flow into the silica tube.

9. The method of claim 1, wherein the second low refractive region is formed by having $C_2F_6$ or $SiF_4$ flow together with $SiCl_4$.

10. The method of claim 1, wherein $SiCl_4$ and $GeCl_4$ are provided into the silica tube to form the central core at step (h).

11. The method of claim 1, wherein the silica tube is heated under the temperature of 2000° C. or beyond at step (i).

12. The method of claim 1, further comprising the step of (k) jacketing the silica tube on the preform after the step (i).

* * * * *